United States Patent [19]
Berteig et al.

[11] Patent Number: 5,956,031
[45] Date of Patent: Sep. 21, 1999

[54] METHOD AND APPARATUS FOR CONTROL OF A PARAMETER VALUE USING A GRAPHICAL USER INTERFACE

[75] Inventors: Rolf Walter Berteig, Seattle, Wash.; Daniel David Silva, San Rafael, Calif.; Donald Lee Brittain, Santa Barbara, Calif.; Thomas Dene Hudson, Port Washington, Wis.; Gary S. Yost, San Francisco, Calif.

[73] Assignee: Autodesk, Inc., San Rafael, Calif.

[21] Appl. No.: 08/903,828

[22] Filed: Jul. 31, 1997

Related U.S. Application Data

[60] Provisional application No. 60/025,117, Aug. 2, 1996.

[51] Int. Cl.$^6$ .......................................................... G06F 3/14
[52] U.S. Cl. ........................... 345/339; 345/420; 345/334
[58] Field of Search ..................................... 345/420, 437, 345/438, 439, 334, 339, 347, 341

[56] References Cited

U.S. PATENT DOCUMENTS

| | | | |
|---|---|---|---|
| 5,196,838 | 3/1993 | Meier et al. | 345/341 |
| 5,428,736 | 6/1995 | Kahl et al. | 345/339 |
| 5,528,260 | 6/1996 | Kent | 345/341 |
| 5,550,563 | 8/1996 | Matheny et al. | 345/341 |
| 5,568,603 | 10/1996 | Chen et al. | 345/341 |
| 5,726,687 | 3/1998 | Belfiore et al. | 345/341 |

OTHER PUBLICATIONS

Mastering Windows 3.1, Special Edition, Sybex, 1992, pp. 156–157.

*Primary Examiner*—Raymond J. Bayerl
*Assistant Examiner*—Chadwick A. Jackson
*Attorney, Agent, or Firm*—McDermott, Will & Emery

[57] ABSTRACT

A method and system for controlling parameter values. One such system includes a number of functions for controlling parameter values, i.e. "parameter control functions," to enable a user to quickly and easily control variable parameter values using a graphical user interface and to enable the user to obtain the desired precision of control of such variables. One such system provides four control functions: a data entry function, single step function, a scroll function, and a translation function. The user can select the particular control function used to control a parameter value in light of the particular amount or type of control that needs to be accomplished.

12 Claims, 13 Drawing Sheets

METHOD AND APPARATUS FOR CONTROL OF A PARAMETER VALUE USING A GRAPHICAL USER INTERFACE

RELATED APPLICATIONS

This application claims the benefit of U.S. Provisional application No. 60/025,117 entitled Three Dimensional Modeling and Animation System, filed Aug. 2, 1996 pending by inventors Rolf Walter Berteig, Daniel David Silva, Donald Lee Brittain, Thomas Dene Hudson, and Gary S. Yost. U.S. Provisional application No. 60/025,117, including all appendices, thereto are hereby incorporated herein by this reference.

COPYRIGHT DISCLAIMER

A portion of the disclosure of this patent document contains material which is subject to copyright protection. The copyright owner has no objection to the facsimile reproduction by anyone of the patent disclosure, as its appears in the Patent and Trademark Office patent files or records, but otherwise reserves all copyright rights whatsoever.

BACKGROUND OF THE INVENTION

1. Field of the Invention

The field of the invention relates generally to a method and apparatus for controlling parameter values using a graphical user interface of a computer system and more particularly to a method and apparatus for enabling a user to quickly and easily control parameter values and receive feedback concerning the control.

2. Background

Graphical user interfaces are commonly used by computer systems to enable computer operators to simply and effectively control the computers in those systems. A computer operator typically will manipulate a variety of graphical objects within such interfaces such as: desktops, windows, cursors, folders, files, icons, buttons, menus, control panels and dialog boxes, to accomplish a variety of tasks on the system. Such graphical user interfaces can play an important role in simplifying computer tasks so that they may be more easily understood and accomplished even by unsophisticated users. Such graphical user interfaces may also provide improved control over the operation of the computer system, and enable a user to easily accomplish tasks that might be difficult to accomplish with other types of interfaces.

A typical graphical user interface provides a display in which windows may be used to organize and show application programs and documents, for example, on a CRT or other display device. Graphical objects that enable the user to accomplish the variety of tasks typically are also provided in the display. Generally a keyboard and a mouse, or similar pointing device, are provided with the computer system for selecting options and interacting with the objects in the graphical user interface. Typically the mouse will have one or more buttons each of which cause the computer to respond in a programmed manner. A user manipulates the cursor on the display by moving the mouse. The cursor may be represented on the display by a wide variety of images such as a vertical bar, an arrow, a hand, a pencil, a can of paint, an eraser or any other desired symbol. The keyboard typically has keys, possibly in foreign languages or symbol sets, for text entry purposes along with other keys which the operating system or application programs can program to respond in various fashions. To interact with objects in the graphical user interface, the user uses the input devices to activate and work with objects. For example, to activate a button, a user would move the mouse so that the cursor was over the button and then activate the appropriate mouse button.

The advantages of graphical user interfaces may enhance the ability of application programs to provide users with desired functions or operations. Application programs can include programs such as word processors, spreadsheets, World Wide Web browsers and other Internet related software, finance software, personal information managers, graphics modeling and animation programs, or any of a wide variety of other programs. Using graphics modeling and animation programs as an example, graphical user interfaces may enhance the users ability to create and manipulate the images or scenes and to manipulate objects being drawn, modeled or animated in an image or scene, for example.

During use of a computer system, a user may desire to control (e.g. set, adjust) some parameter related to a desired task or function or related to some aspect of the computer system. For example, a user may wish to adjust a computer's volume. Again, using a graphics application program as an example, a user may wish to change a parameter associated with an object in an image or scene. A cylinder, for example, may have a radius or a height that the user would like to modify. A cube may have a height, width and depth that need to be controlled.

While graphical user interfaces may provide mechanisms to control such variable parameters, the mechanism provided may not provide the desired combination of speed, ease of use, precision of control and feedback to the user. Additionally, the graphical interface may not arrange the mechanism for providing this control in an optimum or efficient manner, and it may not provide the user with desired flexibility in the manner of accomplishing the control. For example, if the control can be accomplished using a number of different techniques, different graphical objects that may be used to accomplish the different control techniques or to provide feedback concerning the control may be arranged in different areas of the screen. As another example, changing a parameter may require typing a numeric value using a keyboard, making it more difficult to quickly try a number of modifications to the parameter and see the effect of the modifications.

Accordingly, what is needed is an improved method and apparatus for controlling parameters, and in particular numeric parameters, in a graphical user interface. Such a method and apparatus may desirably enable the user to quickly and easily modify such parameters, while providing the user with desired control of the parameters and while providing the user with desired feedback concerning control of the parameters.

SUMMARY OF THE INVENTION

One aspect of the present invention is to provide a user with a plurality of functions for controlling parameter values, i.e. "parameter control functions," to enable a user to quickly and easily control variable parameter values using a graphical user interface and to enable the user to obtain the desired precision of control of such variable parameters. One embodiment of the present invention provides four control functions: a data entry function, single step function, a scroll function, and a translation function. The user can select the particular control function used to control a parameter value in light of the particular amount or type of control that needs to be accomplished.

Another aspect of the present invention is to provide a user with feedback concerning control of variable parameter values in terms of data values, if desired, and in terms of images of objects related to the parameter values, if desired. One embodiment of the present invention displays to the user a data field that contains data representative of the parameter value and a graphical object having a graphical feature representative of the parameter value. In this embodiment, the data and the object's graphical feature change contemporaneously with the change of parameter value to communicate to the user the effect of her control.

Another aspect of the present invention is to provide such control and feedback using a common area of the graphical user interface. In particular, an embodiment of the present invention provides a plurality of overlapping or substantially adjacent graphical objects, such as a data field, an increment button, a decrement button and a control area, that enable the user to control and obtain feedback concerning a parameter value. Because the objects in this embodiment are overlapping or substantially adjacent, the user is able to control and/or obtain feedback without having to substantially move her eyes as she controls the parameter value. This embodiment of the invention may enable a user to use a single graphical user interface object in different ways to obtain a plurality of control functions, for example.

Another embodiment of the invention might combine some or all of the foregoing aspects, for example, integrating a plurality of graphical objects and control areas to provide a plurality of different control functions in a common area of a graphical user interface, enabling a user to use this common area to choose a control function that is desirable under the circumstances (e.g the particular amount or type of control needed).

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF A PREFERRED EMBODIMENT

Embodiments of the invention provide novel methods and apparatus for controlling parameter values using a graphical user interface. The following description is presented to enable a person skilled in the art to make and use the invention. Descriptions of specific applications are provided only as examples. Various modifications to the described embodiments may be apparent to those skilled in the art, and the generic principles defined herein may be applied to other embodiments and applications without departing from the spirit and scope of the invention. Thus, the present invention is not intended to be limited to the described or illustrated embodiments, but is to be accorded the widest scope consistent with the principles and features disclosed herein.

Figure 1:
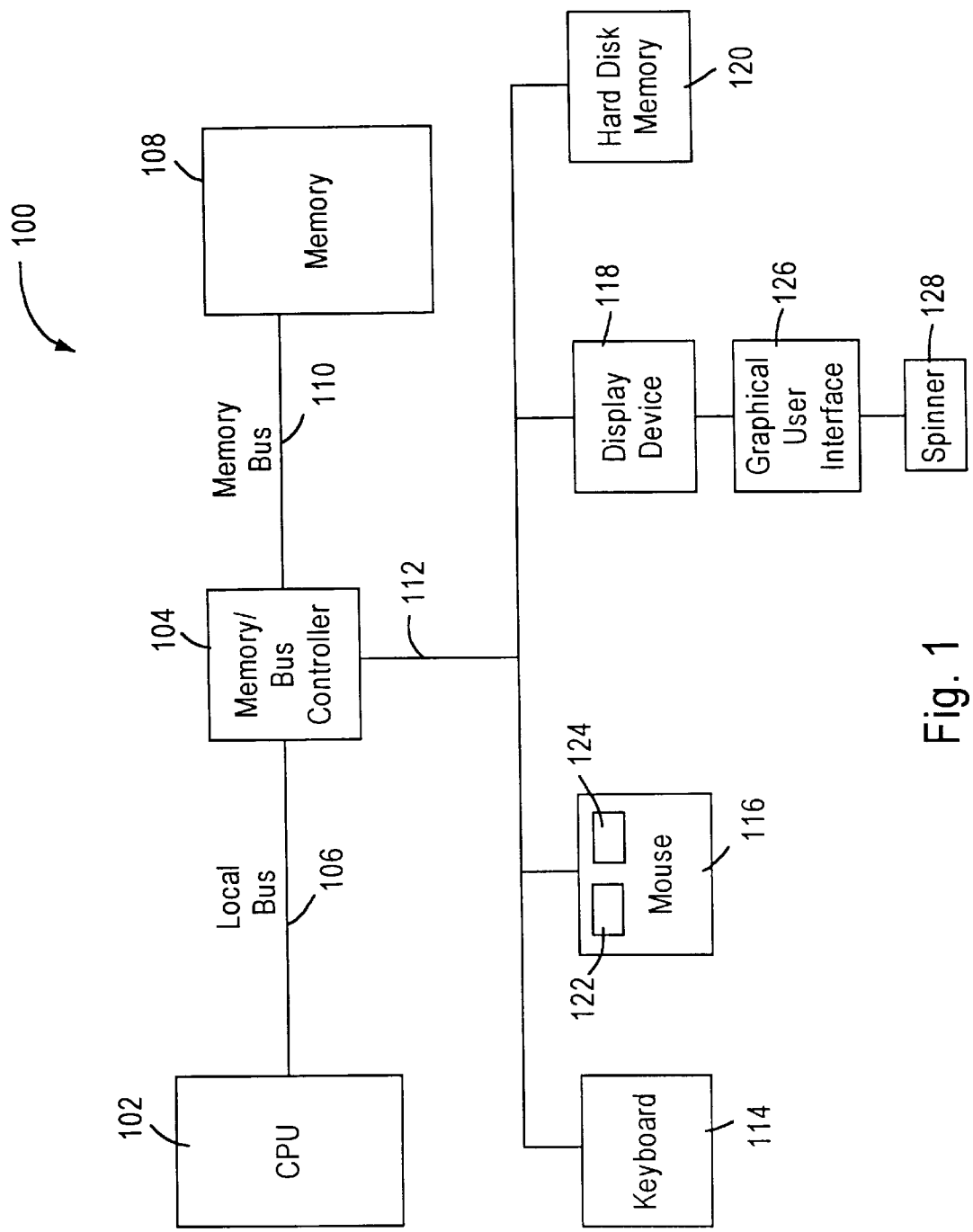
FIG. 1 is a block diagram of a computer system having a graphical user interface containing an embodiment of the invention referred to herein as a "spinner"

FIG. 1 is a simplified block diagram illustrating an example of a general purpose programmable computer system 100 on which an embodiment of the invention is being used. In particular, system 100 includes a central processing unit (CPU) 102 for executing instructions and performing calculations, a memory/bus controller 104 coupled to the CPU 102 by a local bus 106, a memory 108 for storing data and instructions coupled to the memory/bus controller 104 by memory bus 110, a peripheral bus 112 coupled to the memory/bus controller 104, and Input/Output (I/O) devices 114–120 coupled to the peripheral bus 112. The various buses of this system 100 provide for communication among system components in a manner known in the art. The I/O devices 114–120 in system 100 include a keyboard 114, a mouse 116 or other control device, a CRT 118 or other display device and a hard disk memory 120 or other non-volatile storage device for storage of data and programs. In system 100, the mouse has mouse buttons 122 and 124. System 100 is running software that provides a graphical user interface 126. The graphical user interface includes a "spinner" 128 which is an embodiment of the present invention. A "spinner" is an object in a graphical user interface and the underlying software architecture for controlling values of parameters. It has been called a spinner because the present embodiment of the invention enables the use of a function for controlling a parameter value (a "parameter control function") to "spin" through parameter values. Other embodiments of the invention need not have this "spin" feature.

Embodiments of the present invention may be used with commercially available computer systems such as IBM or Apple Macintosh compatible personal computers or with workstations from Silicon Graphics or Sun, for example. Embodiments of the present invention are not limited to use on any of these systems, however. In fact, embodiments of the invention are not limited to use with computer systems presently known in the art.

Figure 2:
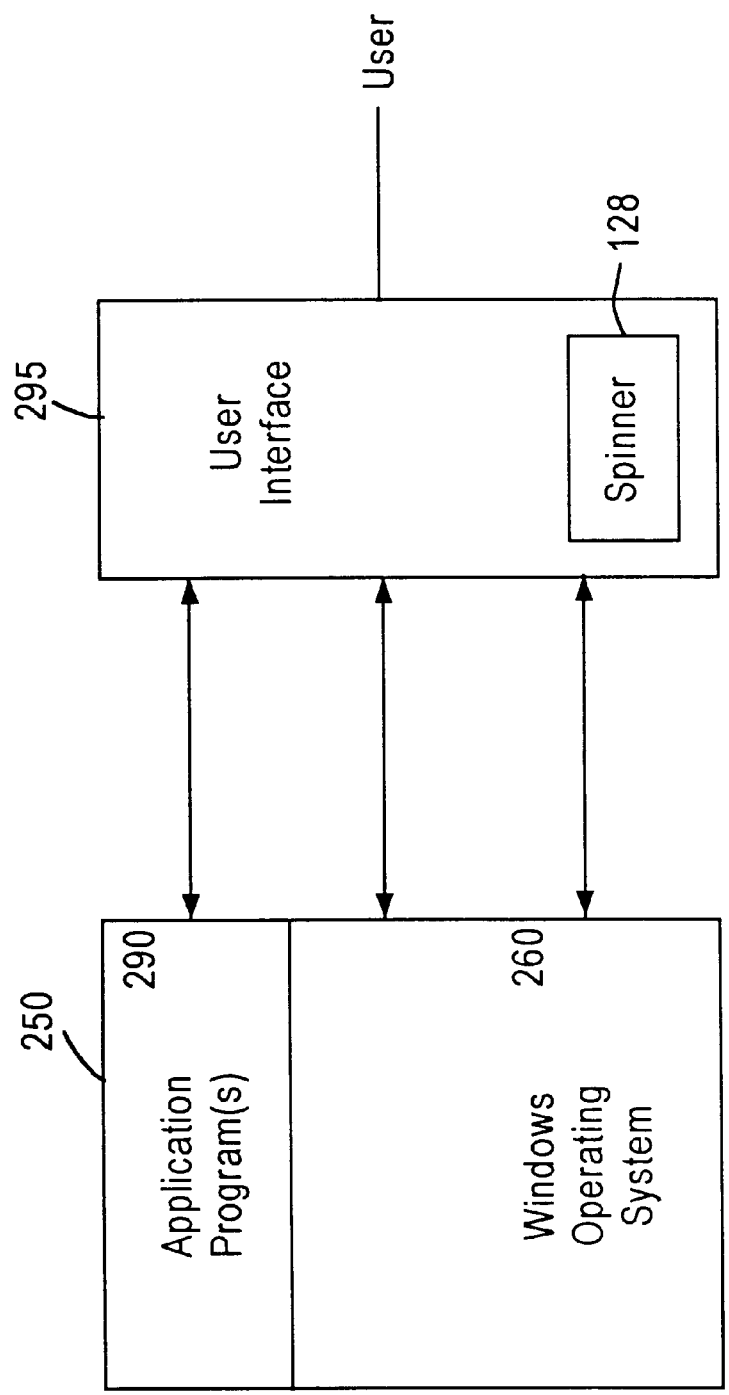
FIG. 2 is a block diagram of software for controlling the operation of the computer system of FIG. 1, including a user interface that includes a spinner embodiment of the invention.

FIG. 2 illustrates software 250 and a user interface 295 that may be used by and run on a computer system such as system 100. FIG. 2 illustrates a Microsoft Windows operating system 260. Of course, a wide variety of operating systems might be used, including, for instance, the Apple Macintosh operating system or UNIX. Application program (s) 290 that may run on such a system may include word processors, spreadsheets, or graphics modeling or animation programs or any of a wide variety of other types of application programs. Software 250 provides routines to interface with the user interface 295. The software 250 may be stored in memory 108 and/or on hard disk 120 and may be transferred between memory devices when it is executed, for example. The user communicates with the computer system 100 through the user interface 295.

Referring to FIGS. 1 and 2, the user interface 295 includes the keyboard 114, the mouse 116 or other control device, the CRT 118 or other display device (e.g. LCD display), the graphical user interface 126 and spinner 128 displayed on the CRT 118. This interface 295 provides a mechanism by which the user can control the computer system and/or manipulate graphical objects in the graphical user interface (GUI) 126. Embodiments of the present invention are not limited to and need not use these components in a user interface, however.

Figure 3:
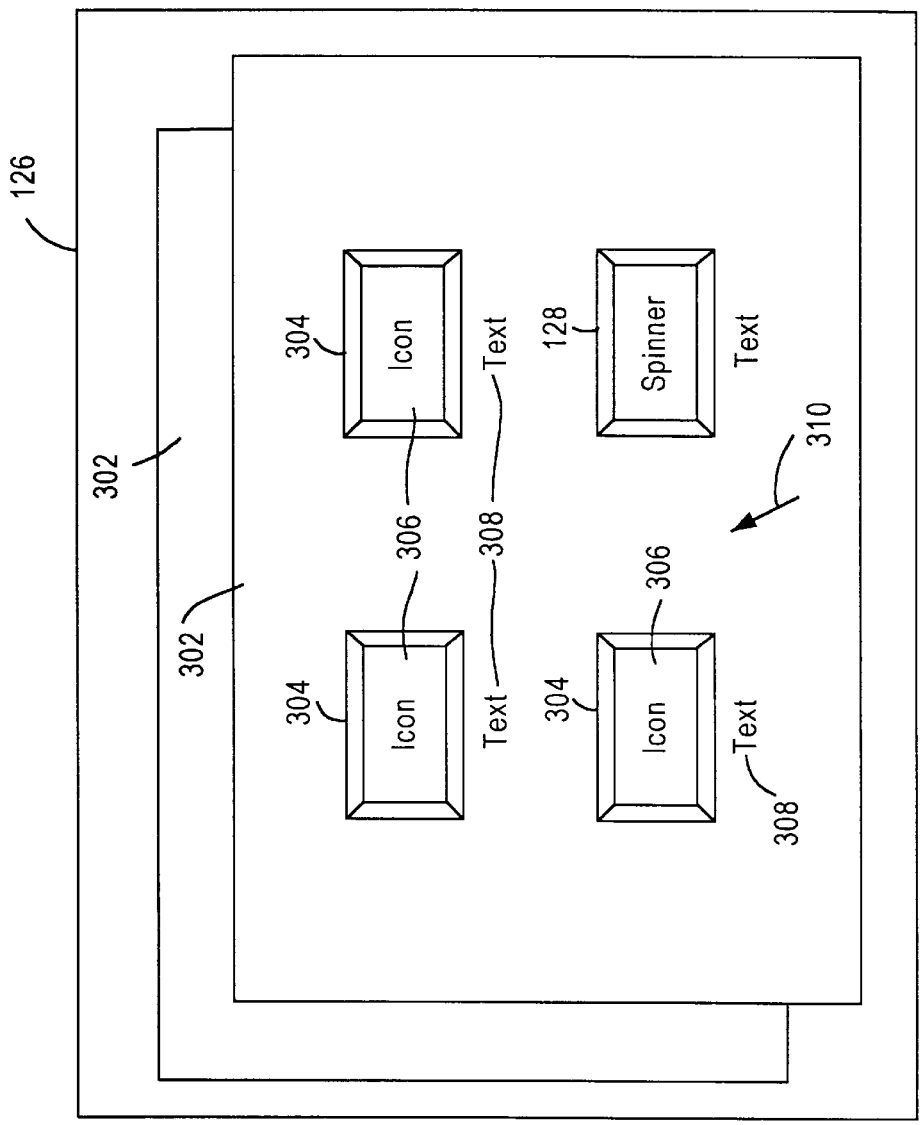
FIG. 3 is an expanded view of the graphical user interface of FIG. 1.

FIG. 3 is an expanded view of a graphical user interface 126. In particular, FIG. 3 illustrates graphical objects such as windows 302, buttons 304 or icons 306, cursor 310 (arrow shaped) and a spinner 128. As shown in GUI 126 in FIG. 3, text 308 may be associated with graphical objects.

Underlying the graphical user interface 126 is a software architecture that enables the user to interact with the computer system and causes the computer system to respond to input the user provides using the user interface, including the graphical user interface. This underlying architecture enables the user to control the position of a cursor, for example, by moving a mouse. It causes the computer to open a document, for example, when the user selects using a mouse a graphical representation of the document in the GUI and selects "open" from a menu. This underlying architecture may be of a type presently known in the art (e.g event driven architecture), but is not limited to presently known architectures. This architecture, in the present embodiment, is programmed to implement the spinner embodiments of the present invention.

FIGS. 4A–D illustrate an alternate graphical user interface 126 that includes embodiments of the present invention. In particular, these figures illustrate a graphical user interface 126 for modeling and animation software. Embodiments of the invention are not limited to use within a modeling or animation software environment, however. In addition, embodiments of the invention are not limited to use with application programs. Embodiments of the invention might be used with other types of application programs, in system software or in other types of software, for example.

Figure 4A:
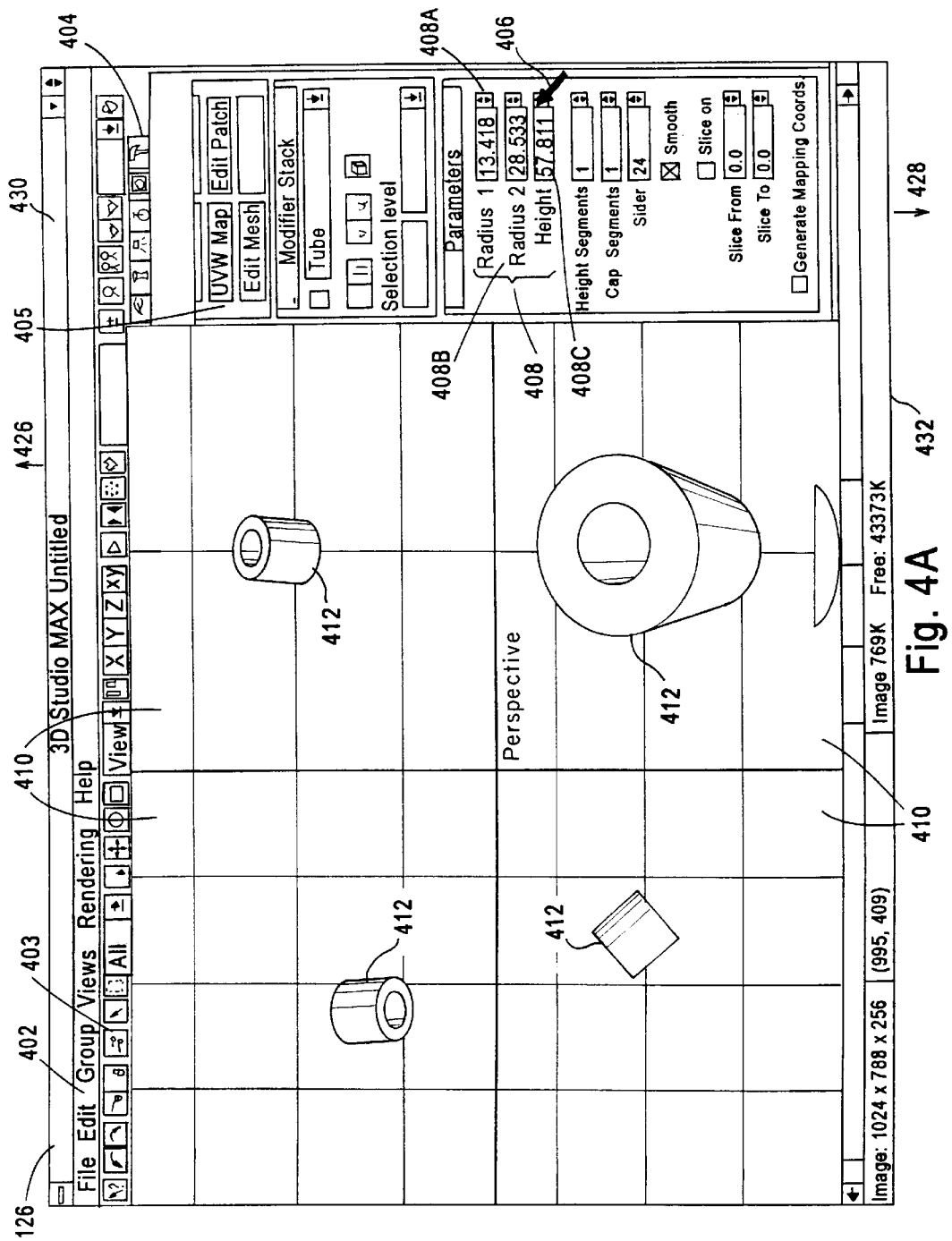
FIGS. 4A,–4C and 4D are screen shots providing an example of how a spinner embodiment of the present invention may be used to control a parameter value and provide feedback concerning the control.

As shown in FIG. 4A, this graphical user interface 126 includes a menu bar 402, a tool bar 403, a command panel bar 404, a command panel 405, cursor 406, "spinners" 408 and viewports 410. The command panel bar 404 enables the user to select command panels that provide controls for creating, modifying and/or animating scenes or graphical objects or for choosing display preferences, for example. Command panel 405 is an example of a command panel that can be selected using the command panel bar 404. Viewports 410 show multiple views of a graphical object in a scene. These multiple views may be useful for visualizing 3D objects on a computer display, for example. Using this graphical user interface, a user can instruct the computer to use the modeling and animation software to perform a variety of graphics related tasks. For example, the user may instruct the computer to create a graphical object, such as 3D cylinder 412, in viewports 410. The viewports 410 show the left, top, front and perspective views of this cylinder 412. For additional description of an example of graphics and modeling software, please see 3D Studio Max User's Guide, Volumes 1 and 2 (March 1996) and 3D Studio Max Tutorials (March 1996) available from AutoDesk, Inc. of San Rafael Calif. These documents are hereby incorporated herein by this reference.

Figure 4B:
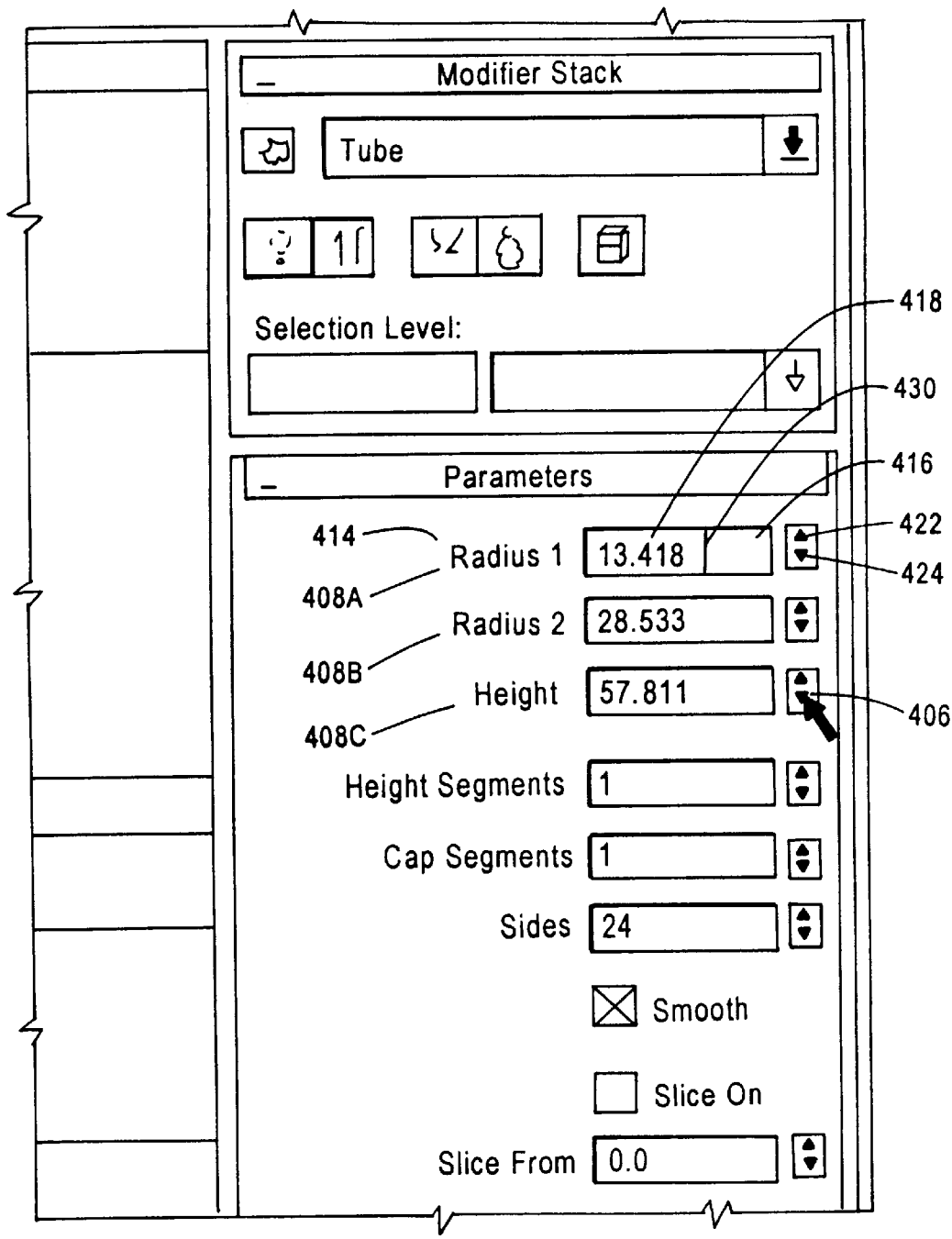
FIG. 4B is an expanded view of spinners illustrated in FIGS. 4A, 4C and 4D

In FIG. 4A, command panel 405 contains spinners 408 (i.e. 408A, 408B and 408C) which are embodiments of the present invention. FIG. 4B shows an expanded view of the spinners 408. A "spinner" is an object in a graphical user interface and the underlying software architecture for controlling parameter values. The present spinner embodiment integrates a plurality of graphical objects and control areas to provide a plurality of parameter control functions in a common area of a graphical user interface. The "common area" might be a control or command panel, a dialog box, a pop-up menu, or a rollout, for example. By integrating these graphical objects and control areas in a common area, this embodiment provides the user with the option to choose a desired manner of controlling a parameter value depending on the particular amount or type of control needed, for example. This embodiment provides a plurality of parameter control feedback mechanisms and integrates feedback with control of parameter values. The integration of the present embodiment enables a user to obtain flexible control and obtain feedback concerning the control without having to substantially move her eyes from the common area as she views the graphical user interface. The present embodiment uses graphical representations of control functions (e.g. an upward arrow to represent an increment function) to achieve this integration in a manner that a user can relatively easily understand. Conventional techniques may not provide the flexibility and degree of control that this embodiment provides by using the plurality of integrated parameter control functions. Conventional techniques may not provide the integration of control in a common area of a graphical user interface in an understandable manner and/or may not integrate feedback with control to facilitate control by the user. Conventional techniques may not integrate the use of the same graphical user interface object with a plurality of control functions as the present embodiment does.

As shown in FIG. 4B, each spinner 408 of the present embodiment includes parameter text 414, a data field such as a numeric entry field 416 and parameter data such as a numeric value 418 in the numeric entry field 416. Each spinner 408 also includes an increment button 422 and a decrement button 424. The parameter text is a brief description of the parameter controlled by that particular spinner. The data field contains the data value which corresponds to the parameter. In the present embodiment the data field is a numeric entry field that contains a numeric value which represents the value of the associated parameter. The increment button is a graphical representation of the function of incrementing the parameter value. The decrement button is a graphical representation of the function of decrementing of the parameter value.

The elements included in the spinners 408 could have other positions in the graphical user interface. In the present embodiment of the invention, however, the elements of the spinners 408 are positioned to provide the user with a visual cue that they relate to control of a particular parameter. For example, the numeric entry field, the numeric value and the increment and decrement buttons of spinner 408A relate to the Radius 1 parameter of the cylinder 412. In addition, in the present embodiment, the elements of the spinners are positioned in a common visual area of the graphical user interface; i.e. an area of the GUI that a user can view without having to substantially move her eyes. This aspect of the present embodiment enables it to provide the user with a variety of techniques for controlling parameters in a small, readily viewable arrangement on the screen. While the present embodiment is illustrated using numeric values and numeric entry fields, other embodiments of the invention might use other types of data fields containing other types of data, such as letters, alphanumeric data or other types of characters or symbols. For example, a parameter value could be a group of letters, for example. In addition, other spinner embodiments of the present invention are not limited to and need not use the same elements as spinners 408.

Spinners 408 provide the user with four techniques for controlling the parameter value. I.e. they provide four types of parameter control functions. Other embodiments are not limited to and need not use these same techniques or this same number of techniques. These techniques shall be referred to as the data entry function, the single step function, the scroll function, and the translation function. The data entry function, the single step function and the scroll function can be described with reference to FIGS. 1 and 4B.

The data entry function enables the user to control the relevant parameter by typing data (e.g a numeric value such as value 418) in a data field (e.g. numeric entry field 416). This function is accessed by using mouse 116, for example, to position cursor 406 over numeric entry field 416 and then depressing button 122 on mouse 116, for example, to create the horizontally flashing text cursor 430 in numeric entry field 416. The cursor 430 in the numeric entry field 416 enables the user to type in a value. The data can be manipulated using a variety of conventional text editing techniques. For example, the text can be highlight by double clicking on it or by using a mouse to drag the cursor across the text while a mouse button is depressed. The arrow keys, home and end keys, backspace and delete keys and enter key can be used to enter and edit the data in the data field. In the present embodiment, relative numeric values can be entered by highlighting the present numeric value and typing a number preceded by an r or R. For example, if a radius field shows 70 and you highlight the 70, type r30 and press the enter key, the numeric value changes to 100. If you highlight the 70, type r-30 and press the enter key, the numeric value changes to 40. If you highlight the 70, type 30 and press the enter key, the numeric value changes to 30.

The single step functions enable the user to achieve unit by unit control of a parameter value by activating the single step increment function or the single step decrement function. Activating the single step increment or decrement function causes the parameter value to be increased or decreased one unit, respectively. The single step increment function may be activated, for example, by positioning cursor 406 over the increment button 422 using mouse 116 and actuating button 122 on the mouse. The single step decrement function can be activated in a similar manner using decrement button 424. The cursor 406 may be positioned and the increment and decrement functions activated, however, using devices other than a mouse, including control and/or activation using a keyboard, joystick, trackball or track pad, for example. The user can use the single step increment and decrement functions to repeatedly increment or decrement the parameter value by repeatedly activating the respective functions (e.g. repeatedly actuating mouse button 122 when the cursor 406 is positioned over the increment or decrement button). While the present embodiment is described in terms of "increments" and "decrements" which may connote numbers, we have noted that embodiments of the invention need not use numbers. Accordingly, the single step function may use other types of single unit changes.

Figure 4C:
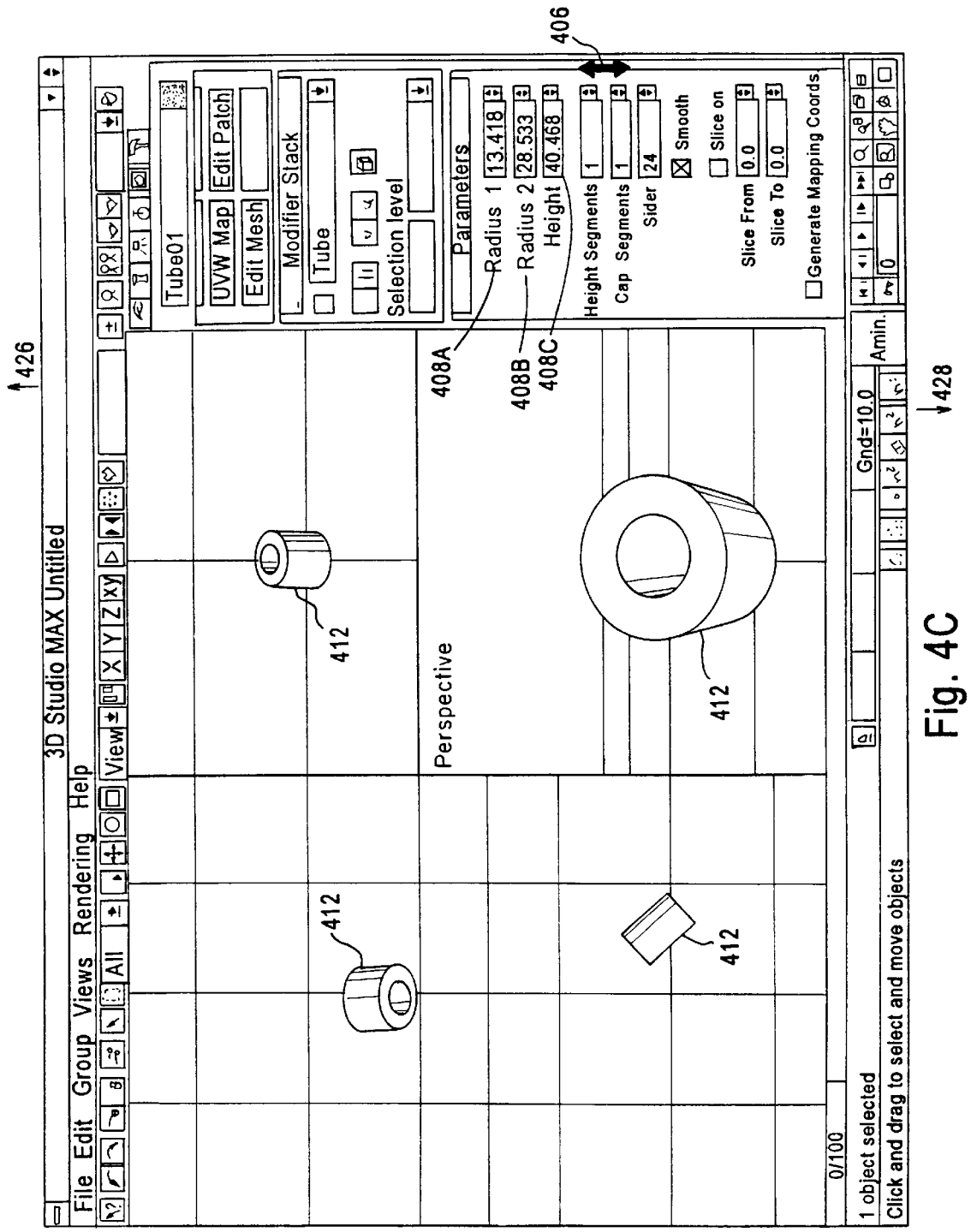

In the present embodiment, the value of the single unit by which the parameter value is incremented or decremented is automatically determined by the software and depends on the value in the numeric entry field. This single unit can be chosen by the user, however, using the panel 445 illustrated in FIG. 4E. In particular, the user can define a "spinner snap" as the single unit that the spinner will use when incremented or decremented. As shown in FIG. 4E, the user can enter the value of the spinner snap in the area 450 of panel 445. The user can select area 452 to instruct the software to use this entered spinner snap and can deselect area 452 to instruct the software not to use this spinner snap. Selecting area 452 will place an X in the area and deselecting it will leave the area blank.

In addition to these single step functions, the present embodiment includes scroll increment and decrement functions to scroll parameter values. In the present embodiment, for example, the scroll increment function can be used to scroll incrementally through parameter values when it is activated. The scroll increment function can be activated by positioning the cursor 406 over the increment button 422 using mouse 116, pressing the mouse button 122 and keeping button 122 depressed for more than a predefined delay. This predefined delay is the time t referred to in the flow charts in FIGS. 6A–6C. Upon initially pressing mouse button 122, the parameter value will increment one unit because the single step increment function will have been activated. After a predefined delay t passes, the scroll increment function is activated, causing the parameter value to continuously scroll through single unit increments until the scroll increment function is deactivated. In the present embodiment, the scroll increment function can be deactivated by releasing the button 122 on mouse 116. The scroll decrement function can be activated and deactivated in a similar manner to scroll decrementally through parameter values. In one embodiment of the invention, the predefined delay may be user adjustable. In the present embodiment, the single units used by the scroll increment and decrement functions are determined in the same manner as the single units used with the single step functions. Thus, the scroll functions are basically very rapid, automatic single step functions. In one embodiment of the invention, the single units used by the scroll function may automatically change during the scroll in a desired manner depending on a variety of variables such as the parameter value at a present time or the length of time the increment or decrement button has been activated, for example.

The translation function for controlling parameter values can be explained with reference to FIGS. 1 and 4A–4D. When using the translation function, a control device (e.g. mouse 116) is used to provide input of a type which could be used to move (translate) a cursor in a graphical user interface. This type of input shall be referred to as translation input. While the cursor in the present embodiment actually moves in response to this input, other embodiments of the invention need not actually move the cursor. A translation function is any function that adjusts a parameter value in response to translation input. Also, while the present embodiment uses mouse 116 to provide translation input, other embodiments may provide this input using other types of control devices, such as a trackball, track pador the arrow keys on the keyboard, for example.

In the present embodiment, the translation function is activated by using mouse 116 to position the cursor 406 over a control area in the graphical user interface, pressing the mouse button 122 and translating the cursor out of the control area. A control area is an area on the graphical user interface used to activate the translation function. In the present embodiment, the increment button 422 is a control area and the decrement button 424 is a second control area. Optionally, activation of the translation function may occur upon translation of cursor 406 out of the control area only in particular directions or it may occur upon movement of the mouse 116 in any direction without causing the cursor 406 to move. Another alternate embodiment might activate the translation function in response to positioning the cursor 406 over a control area and pressing the mouse button 122 alone.

In the present embodiment, upon activation of the translation function, the parameter value can be controlled by translating the cursor 406 and/or the mouse 116, for example, in a predetermined manner. In particular, the parameter value is increased by translating the cursor 406 in an upward direction on the GUI and decreased by translating the cursor 406 in a downward direction on the GUI. In other embodiments, different types of translation (e.g. different directions or types of motion) could be used and different types of control (e.g. other than incrementing or decrementing) could be implemented. One alternate embodiment might stop translation of the cursor once the cursor has moved out of the control area while the parameter value continues to change in response to translation input.

The rate at which the parameter value changes in response to translation input can be controlled by the user. For example, the user might press the CTRL key while providing translation input to increase the rate at which the parameter value changes and the ALT key to decrease the rate at which the parameter value changes. This rate is the rate r identified in the flow charts in FIGS. 6A–6C. In the present embodiment, the translation function is deactivated by releasing the mouse button.

The present embodiment has integrated control areas with the increment and decrement buttons 422 and 424. In particular, these buttons, in addition to being graphical representations of the function of incrementing and decrementing a parameter value, are each also a control area. Accordingly, after either the increment or decrement functions is activated by pressing the mouse button while the cursor is over the increment or decrement button 422 or 424, respectively, translating the cursor 406 outside the boundary of the button activates the translation function. While the present embodiment has integrated the increment button 422 with a control area and the decrement button 424 with a second control area, other embodiments of the invention need not use such integration. In addition, other embodiments could integrate the control area with elements of a spinner in different ways. In particular, a spinner could make the numeric entry field 416, the increment button 422 and the decrement button 424 a single control area. A variety of combinations could be used. The integration enhances the present embodiment by helping to organize a variety of parameter value controls that provide a variety of parameter control functions in a relatively small area of the screen (e.g. within 0.5, 1, 1.5 or 2 inches of each other for example). The present embodiment actually provides a variety of parameter control functions using the same or overlapping areas of the screen.

The present spinner embodiments provide the user with feedback concerning the parameter value in two different ways. In particular, data field (e.g. the numeric entry field 416) contains data (e.g. a numeric value) that represents the parameter. This data changes as the parameter value is changed. In the present embodiment, this feedback mechanism is located in a common visual area of the screen as the other elements of the spinner. The second type of feedback provided by the present embodiment is the contemporaneous modification of a graphical object in response to the change in parameter values of the graphical object. For example, increasing the height parameter value of the cylinder 412 causes the height of the cylinder 412 to contemporaneously increase. Whether or not this second type of feedback is provided typically will depend on the particular situation in which the parameter value is being controlled. In addition, again depending on the particular situation, this second type of feedback may take forms other than a graphical representation. For example, if a spinner embodiment of the present invention is used to increase a computer's volume, this feedback may take the form of a chime. Because of the nature of this second type of feedback, this second feedback mechanism may not be a graphical object located in the same area of the screen as the rest of the spinner elements. The software architecture underlying the graphical user interface objects representing the spinner coordinates the operation of these feedback mechanisms with each other and with the control of the parameter value. FIGS. 4A–4D illustrate an example of the translation function being used to adjust a parameter (e.g. the height) of a graphical object (e.g. a cylinder). In particular, FIG. 4A shows a cylinder 412 having the parameters Radius 1, Radius 2 and Height. The Radius 1 is represented by the numeric value in spinner 408A, the Radius 2 is represented by the numeric value in spinner 408B, and the Height is represented by the numeric value in spinner 408C.

FIG. 4A shows the cursor 406 positioned over a control area of spinner 408C (i.e. spinner 408C's increment button). At this point, the translation function may be activated, for example, by pressing the mouse button and translating the cursor 406 out of the control area in direction 426 or 428. FIG. 4C shows the cursor 406 that has been translated in direction 428 from the position shown in FIG. 4A to the position shown in FIG. 4C, activating the translation function and decreasing the height parameter value. The decrease in the height parameter value is communicated to the user by the height numeric value decrease from 57.811 in FIG. 4A to 40.468 in FIG. 4C and by the height decrease of the cylinder 412. In particular, this embodiment provides the user with contemporaneous numeric and visual feedback concerning control of the parameter value. As also shown, the cursor 406 has changed from a single headed arrow to a double headed arrow, indicating to the user that the translation function is activated.

Figure 4D:
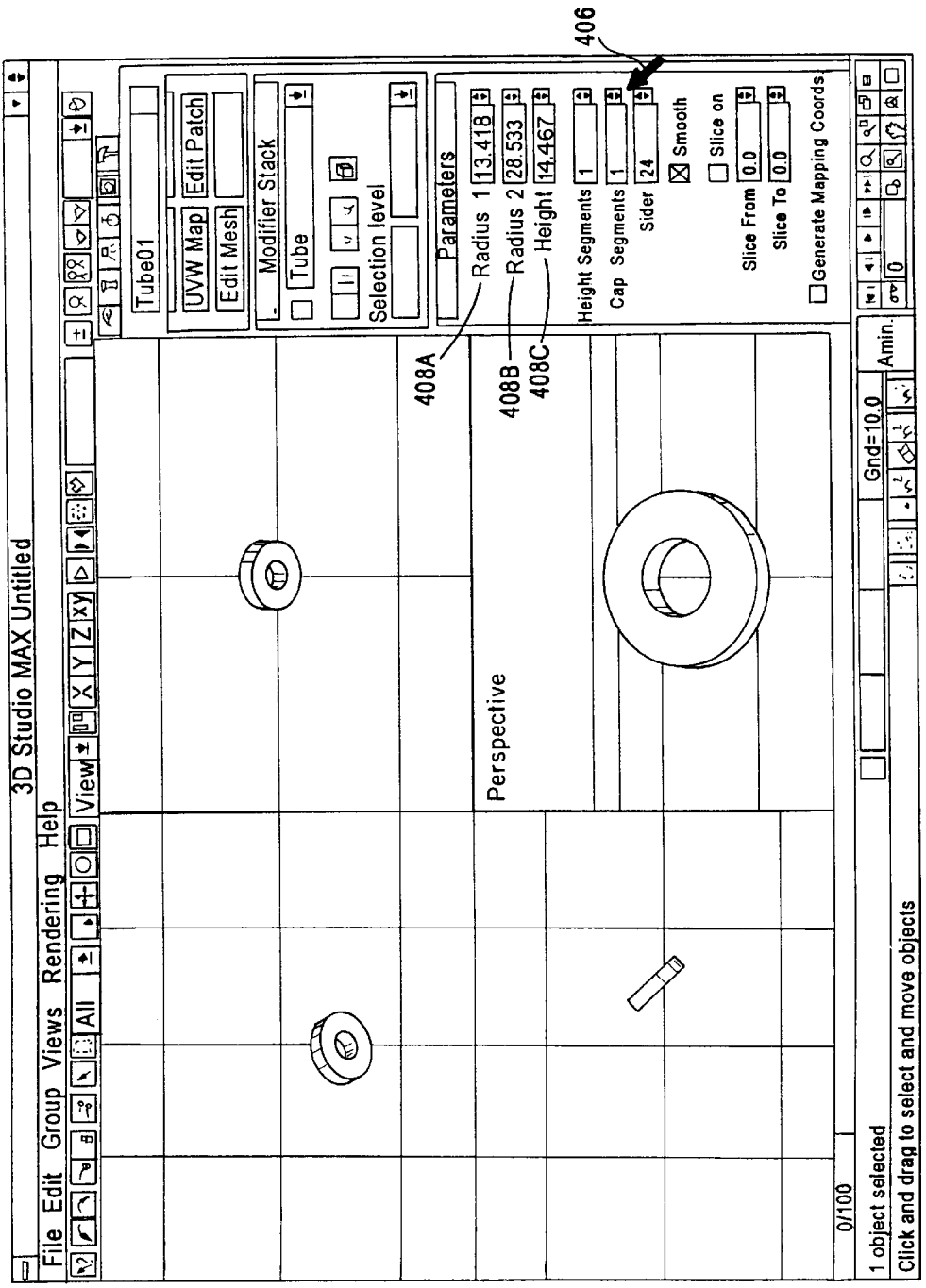
Figure 4E:
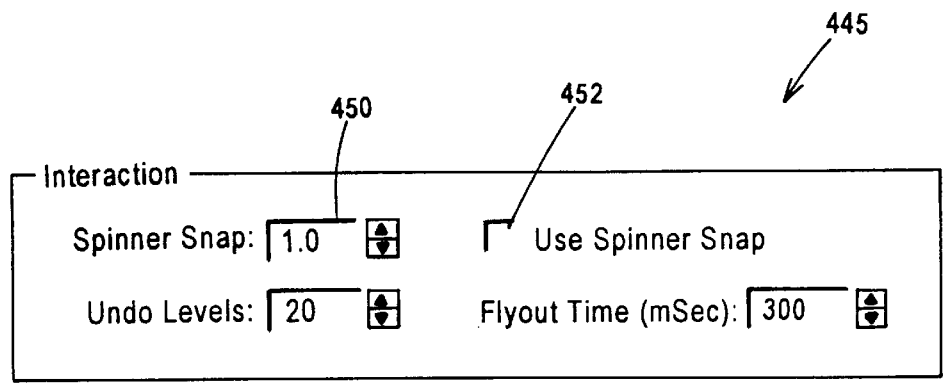
FIG. 4E illustrates a panel used to adjust parameters associated with embodiments of the present invention.

FIG. 4D illustrates the cursor 406 after it has been translated to a final position while using the translation function and after the translation function has been deactivated. In particular, FIG. 4D shows that the height parameter value has decreased further as represented by the height numeric value decreasing to 14.467 and the height of the cylinder 412 decreasing. As illustrated, when the translation function is deactivated, the cursor changes back from the double headed arrow to the single headed arrow.

Figure 5A:
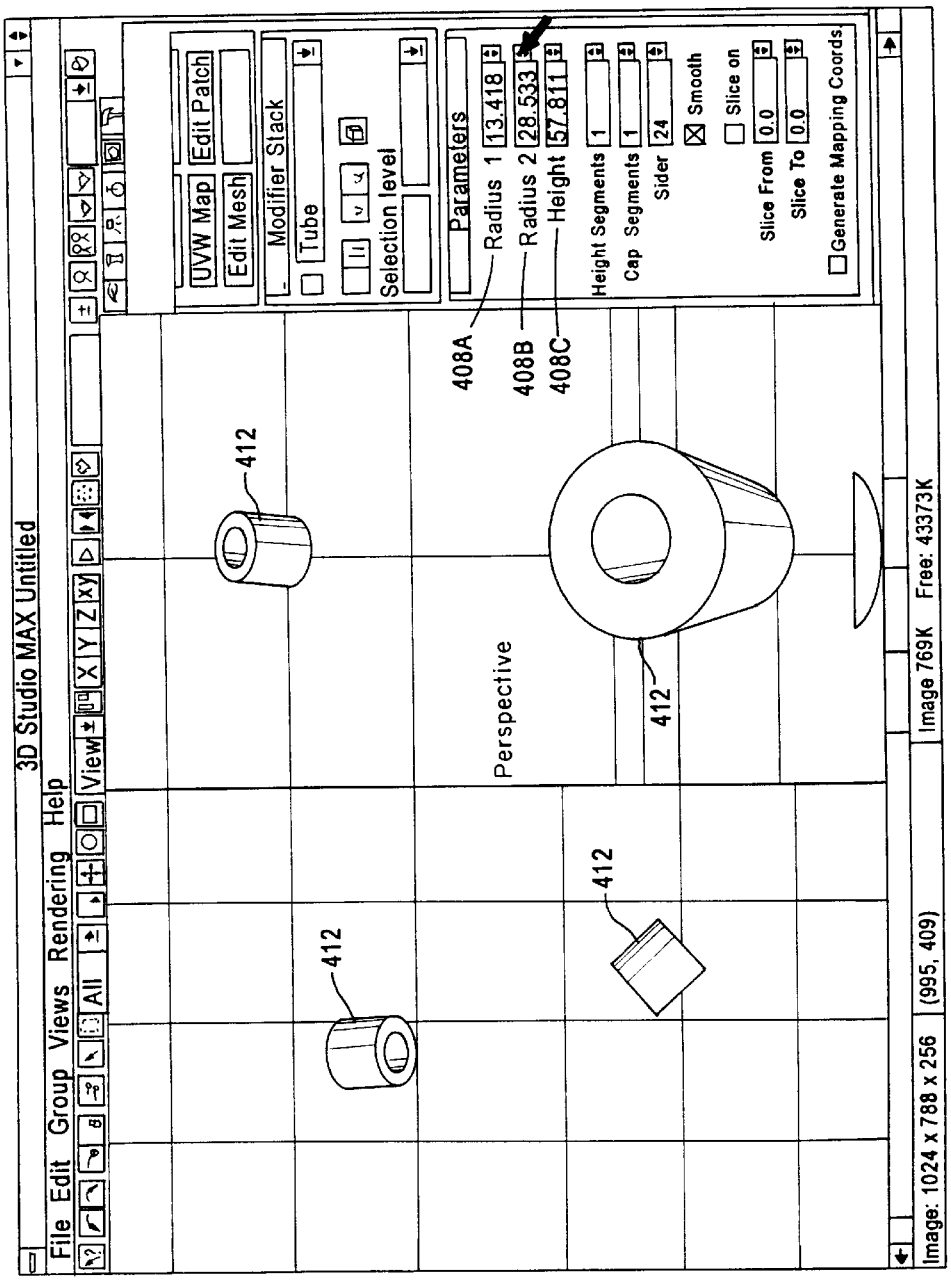
FIGS. 5A and 5B are screen shots providing a second example of how a spinner embodiment of the present invention may be used to control a parameter value and provide feedback concerning the control.
Figure 5B:
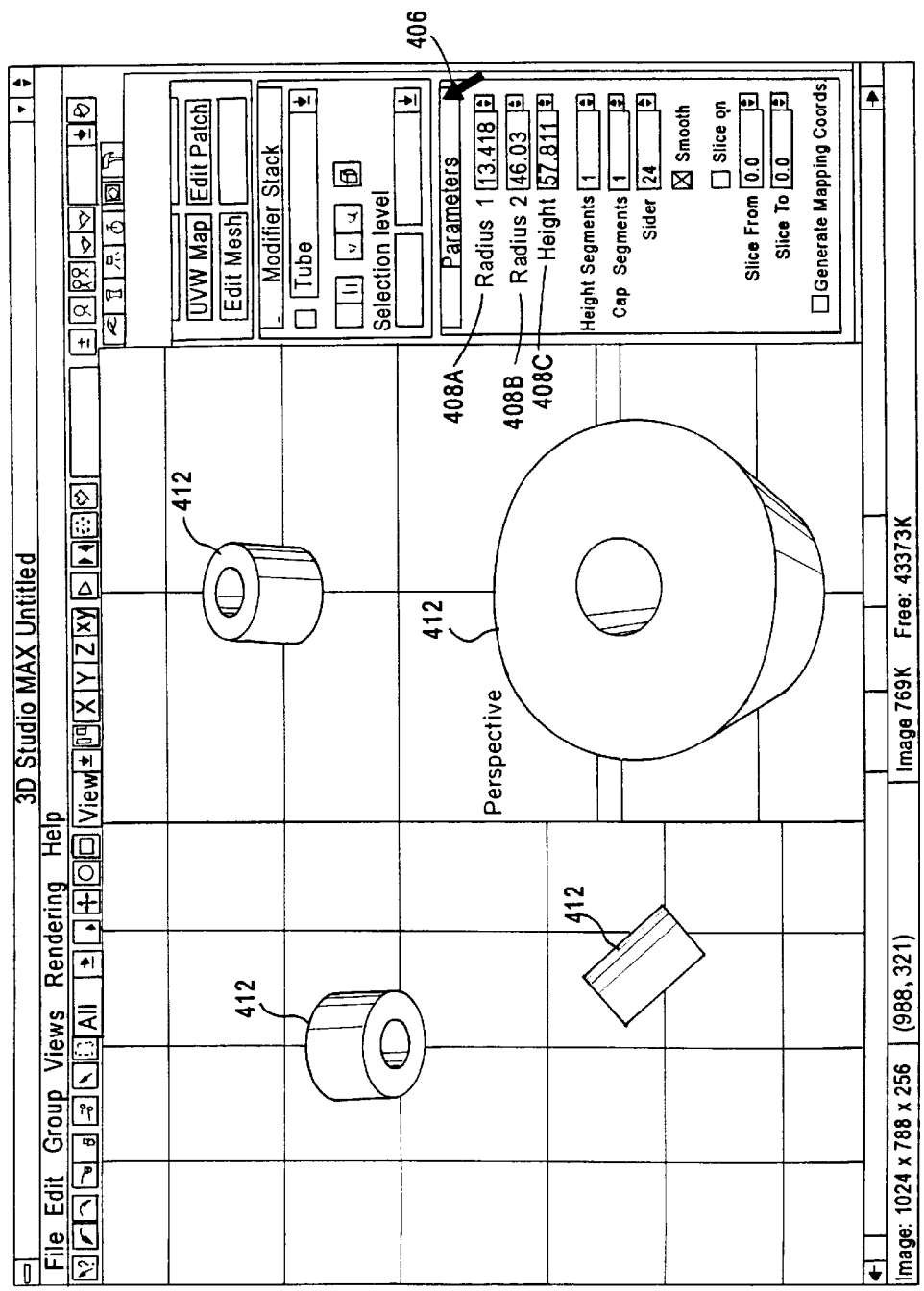

FIGS. 5A and B show a similar adjustment of the Radius 2 parameter using the spinner 408B. As shown in these Figures, use of the translation function and movement of the cursor from the position in FIG. 5A to the position in FIG. 5B has caused the value of the Radius 2 parameter to increase as represented by the increase of the numeric value from 28.533 to 46.03 and as represented by the increase in the Radius 2 of the cylinder 412.

In the present embodiments, the spinners 408 are used to control parameters related to a graphical object, the cylinder 412, being created in a modelling program. In other embodiments, spinners could be used to control parameters related to other types of objects in a graphical user interface or even other components of a computer system not illustrated in a graphical user interface. Embodiments of the present invention are not limited to use in personal computers, but might be used in other personal or commercial computer system applications. Spinners might be used to control test equipment driven through a port of a computer system, for example. While the present embodiments illustrates spinners as a part of a command panel, they may be used in other contexts.

Figure 6A:
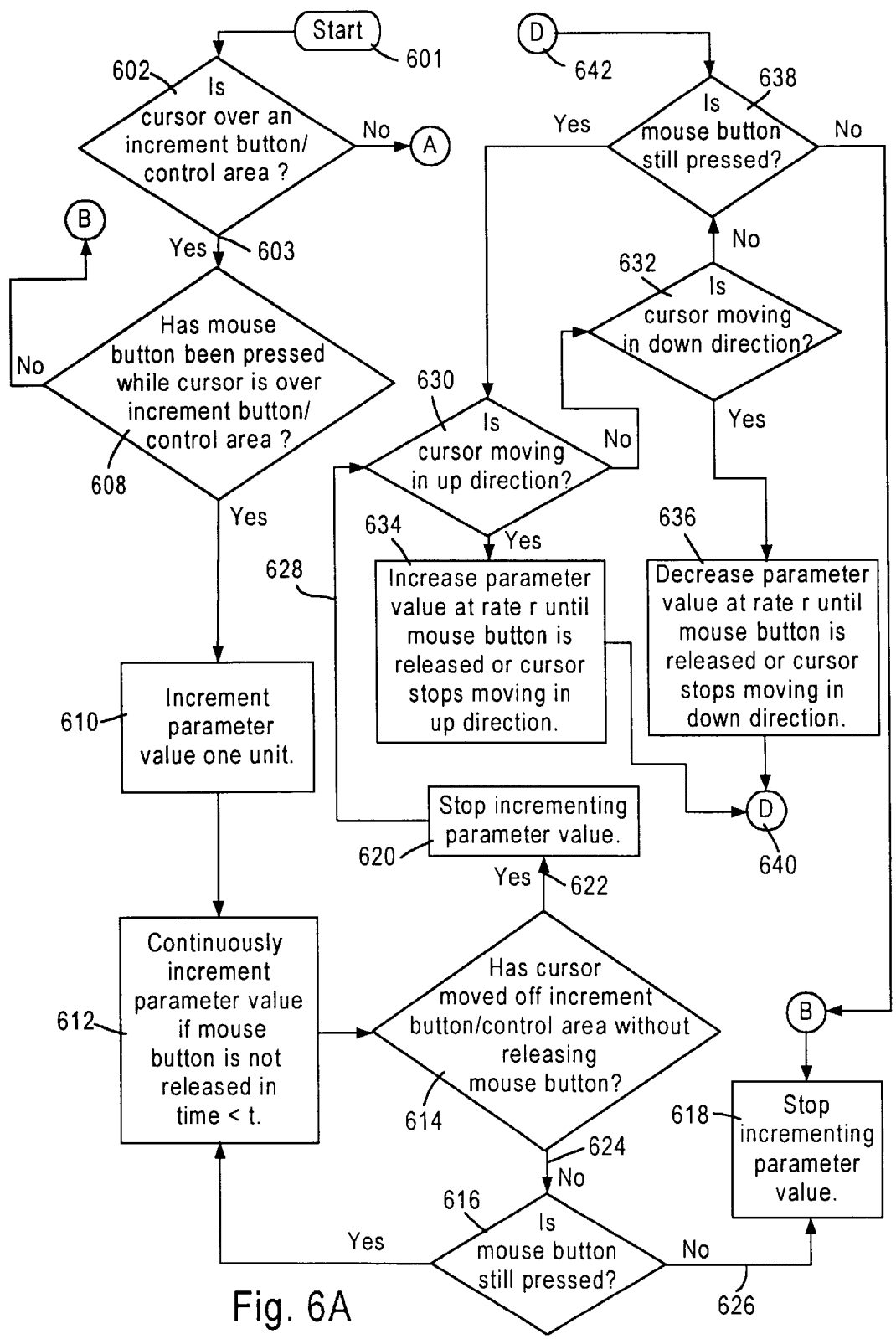
FIGS. 6A–6C illustrate a flow chart describing the operation of one embodiment of the present invention.
Figure 6B:
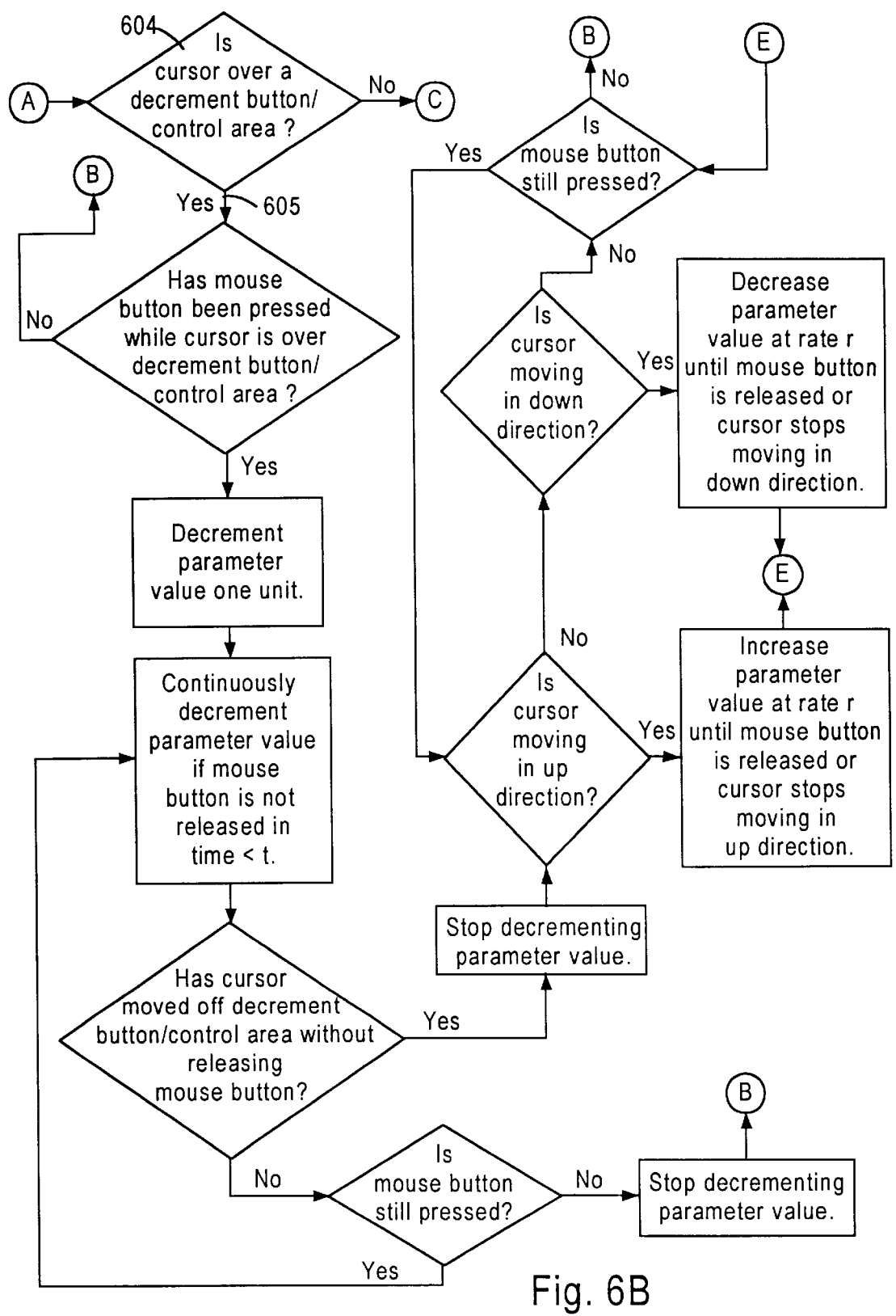
Figure 6C:
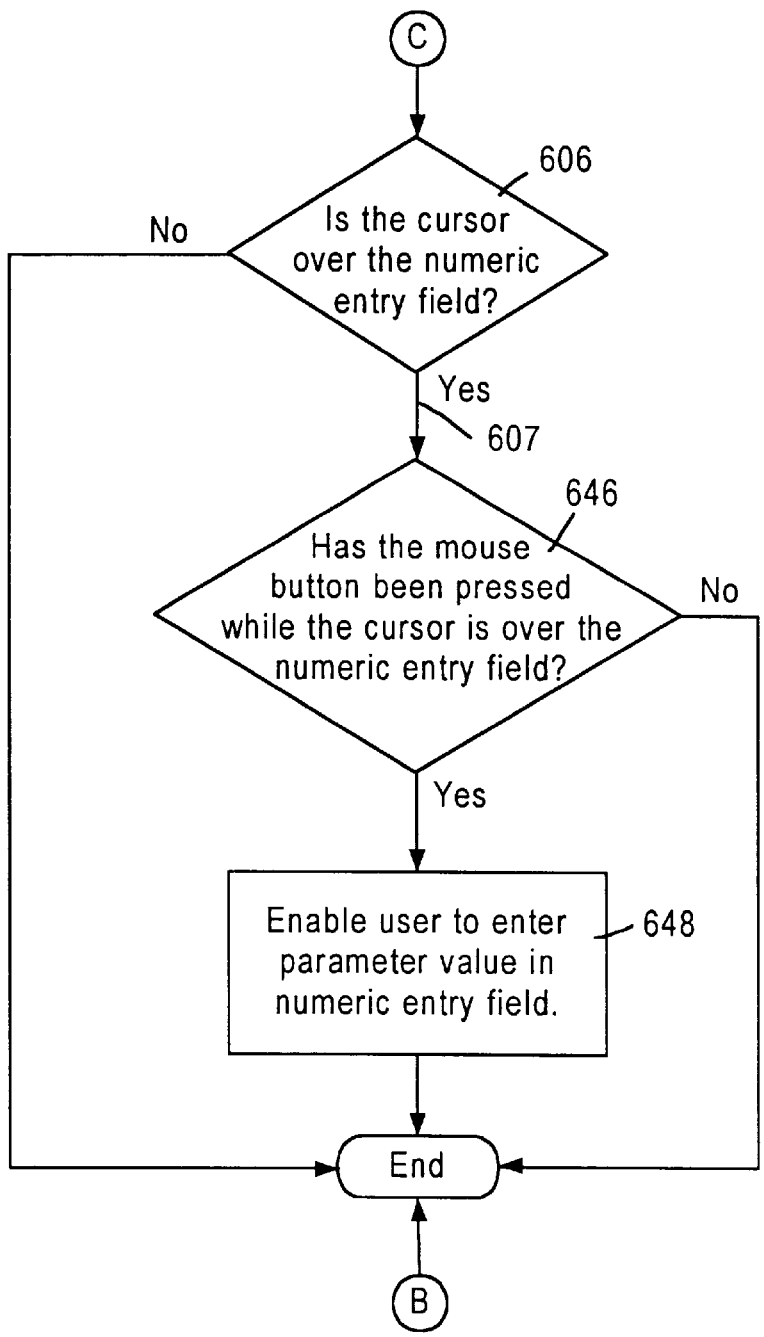

FIGS. 6A–6C illustrate a flow chart demonstrating how hardware and software implementing the spinners 408 operates. In particular, this embodiment initially determines if a control function has been activated. It does so as follows. Initially, it determines if the cursor 406 is over a control area as illustrated in boxes 602 and 604 or if the cursor is over a data field such as a numeric entry field 416 as shown in box 606. In the present embodiment, these boxes determine which control functions might be activated given a particular cursor position. If the cursor 406 is over the increment button/control area 422 as indicated in box 602, for example, then the single step increment, scroll increment or translation function might be activated as represented by the boxes starting from flow 603. If the cursor is over the decrement button/control area 424 as indicated in box 604, then the single step decrement, scroll decrement or translation function might be activated as represented by the boxes starting from flow 605. If the cursor is over a data field such as a numeric entry field 416 as indicated in box 606, then the data entry function might be activated as represented by the boxes starting from flow 607. While the present embodiment of the invention relies upon the position of the cursor to activate control functions, other embodiments of the invention need not do so or they need not do so in the same manner as this embodiment.

After determining which control functions might be activated based upon the cursor position, this embodiment determines whether or not any of these control functions actually have been activated. In particular, if the cursor is over the increment button/control area 422 as indicated in box 602, the operation of the present embodiment is illustrated in FIG. 6A. As shown by following flow 603, the software accomplishes the single step increment function and increments the parameter value one unit in response to an event, such as clicking the mouse button. This response is represented by boxes 608 and 610. In particular, upon pressing the mouse button 122 when the cursor is over the increment/control area button 422 (box 608), the parameter value is incremented one unit (box 610). While the described embodiment responds to a mouse click, other embodiments of the invention could use other events to activate the single step increment function.

After the single step increment function is activated, the present embodiment determines if the scroll increment function or the translation function are activated. In particular, as shown by box 612, if the mouse button is not released in a time less than t, then the scroll increment function is activated. I.e. the parameter value will continuously and automatically scroll upward in a unit increments. If the cursor is moved off of the increment button/control area or the mouse button is released, the scroll increment function will stop as shown by boxes 614, 620, 616 and 618. If the scroll increment function has been deactivated by releasing the mouse button as shown by flows 624 and 626, the routine has ended. Flows 624 and 626 also show the operation of the present embodiment if the mouse button 122 had been released in less than time t as specified in box 612. If the scroll increment function has been deactivated by moving the cursor off of the increment button/control area without releasing the mouse button as shown by flow 622, the translation function is activated as represented by flow 628.

The translation function of the present embodiment is represented by boxes 630, 632, 634, 636, 638 and connectors 640 and 642. In particular, during operation of the translation function, if the cursor 406 is moving in the up direction (shown in FIG. 4A as direction 426), then the parameter value will increase at a rate r until the mouse button is released or the cursor 406 stops moving in the up direction (box 634). Box 630 tests for up direction movement. If the cursor 406 is moving in the down direction (shown in FIG. 4A as direction 428), then the parameter value will decrease at a rate r until the mouse button is released or the cursor 406 stops moving in the down direction (box 636). The rate r is the unit change of parameter value per unit change of cursor movement. While the present embodiment uses cursor movement, we have noted that other embodiments of the invention need not do so. In particular, we indicated that the cursor need not move or be used at all, but that the parameter value could respond to other types of translation input. Accordingly, the rate r generally is the unit change of the parameter value per unit change of translation input. In the present embodiment, if the cursor 406 stops moving in the up or down direction but the mouse is not released, the embodiment will respond to changes of direction as shown by boxes 634 and 636 and the loop formed by connectors 640 and 642. For example, if the cursor is moving upward (box 634), but is stopped and moved back downward, the operation of the present embodiment is to leave box 634 when the cursor stops moving upward and to flow through connectors 640 and 642 to test again for direction of movement in boxes 630 and 632. In the present embodiment, if the cursor moves in a diagonal direction, for example, the parameter value will change based only upon the component of the movement in direction 426 or 428. Other embodiments of the invention can be configured to respond to translation input in different ways. For example, an alternate embodiment might use translation of the cursor to the right of the screen to increase the parameter value and translation to the left of the screen to decrease it. Other embodiments might rely on different directions, angles or shapes of movement to control parameter values.

If the cursor is over the decrement button/control area 424 as indicated in box 604, then the operation of the present embodiment is illustrated in FIG. 6B. In particular, the single step decrement, scroll decrement or translation function might be activated as represented by the boxes starting from flow 605. Operation through flow 605 represents the single step decrement, scroll decrement and translation function in the similar manner as just described for the increment and translation functions. In the present embodiment, the translation function operates in the same manner whether it is entered from the flow 603 or flow 605 branch of the flowchart. Other embodiments of the invention need not have this characteristic.

If the cursor is over a data field such as a numeric entry field 416 as indicated in box 606, then operation of the embodiment is illustrated in FIG. 6C. The data entry function enables a user to enter data into a data field as shown in boxes 646 and 648. Clicking the mouse while the cursor is over the data field is an example of how this function might be activated. Other types of activation may be used (e.g. double clicking, somehow using the keyboard, some kind of tool in the graphical user interface).

The control of the parameter value by the embodiment of the present invention is communicated to the underlying application with which the embodiment. Thus, in the present embodiment, the control of the parameter value is communicated While Applicant has described the invention in terms of what is presently considered to be the preferred embodiment, the invention is not limited to or by the disclosed embodiment. The person of ordinary skill will readily appreciate that the Applicant's inventions can be applied beyond the particular systems mentioned as examples in this specification. The invention comprises all embodiments within the scope of the appended claims and/or supported by the disclosure.

What is claimed is:

1. A method for controlling an appearance of an object displayed by a graphics application program using a computer system and a graphical user interface, wherein the appearance is defined in part by a parameter value, the method comprising the steps of:

providing a first control area in the graphical user interface;

providing a plurality of parameter control functions, wherein at least one of the parameter control functions is associated with and controls the parameter value and is configured to be manipulated using the first control area;

displaying a cursor in the first control area;

in response to a first translation input of a cursor control device that controls the cursor, in which the first translation input defines a translation out of the first control area in a first direction, changing the parameter value and the appearance of the object using one of the parameter control functions that is associated with the parameter value, according to the first direction;

wherein the first translation input is an operation that moves said cursor to a first location that is in said first direction relative to said first control area;

while said cursor is at said first location, and in the same operation, receiving second a translation input that moves said cursor from said first location in a second direction that is opposite to the first direction; and in response to said second translation input, changing the parameter value and the appearance of the object in a manner opposite to that caused by the first translation input.

2. The method of claim 1, further comprising controlling the rate at which the parameter value changes by:

receiving user input that indicates a snap value; and while changing the parameter value in response to receiving said first transaction input, limiting the magnitude of successive changes to the parameter value to said snap value.

3. The method of claim 1 wherein the first translation input and the second translation input comprise one continuous operation.

4. A method for controlling a parameter value and an appearance of virtual graphical object having at least one visual attribute using a computer system and a graphical user interface, the method comprising the steps of:

displaying on the graphical user interface a user interface control that is associated with said parameter value;

displaying a cursor on the graphical user interface;

receiving input from a cursor control device associated with said cursor, wherein said cursor control device is capable of generating activation input and translation input;

in response to receiving activation input but not translation input from said cursor control device while said cursor is within said user interface control, invoking a first parameter control function that changes the parameter value and proportionately increasing the visual attribute of the virtual graphical object;

in response to receiving a first translation input that activates said cursor within said user interface control and moves said cursor in a particular direction outside said user interface control, invoking a second parameter control function; and in response to being invoked, said second parameter control function changing the parameter value based on said particular direction;

wherein the first translation input is an operation that moves said cursor to a first location that is in said first direction relative to said user interface control;

while said cursor is at said first location, and in the same operation, receiving second a translation input that moves said cursor from said first location in a second direction that is opposite to the first direction; and in response to said second translation input, changing the parameter value and the visual attribute of the virtual graphical object in a manner opposite to that caused by the first translation input.

5. The method of claim 4 wherein the step of invoking a first parameter control function that changes the parameter value includes invoking a step function that changes the magnitude of the particular parameter by a predetermined amount.

6. The method of claim 4 further comprising the steps of:

displaying a visual object that has an appearance that is dictated in part by a visual attribute that corresponds to said parameter value; and responding to changes to said parameter value by changing the appearance of said visual object to reflect the changes to said parameter value.

7. A computer-readable medium carrying instructions for controlling an appearance of an object displayed by a graphics application program, wherein the appearance is defined in part by a parameter value, using a computer system and a graphical user interface, the instructions including instructions for performing the steps of:

providing a first control area in the graphical user interface;

providing a plurality of parameter control functions, wherein at least one of the parameter control functions is associated with and controls the parameter value and is configured to be manipulated using the first control area;

displaying a cursor in the first control area; and in response to a first translation input of a cursor control device that controls the cursor, in which the first translation input defines a translation out of the first control area in a first direction, changing the parameter value, and the appearance of the object using one of the parameter control functions that is associated with the parameter value, according to the first direction;

wherein the first translation input moves said cursor to a first location that is in said first direction relative to said first control area, and the method further includes the steps of:

while said cursor is at said first location, receiving a second translation input that moves said cursor from said first location back towards said first control area; and in response to said second translation input, changing the parameter value and the appearance of the object in a manner opposite to that caused by the first translation input.

8. The computer-readable medium of claim 7, further comprising instructions for controlling the rate at which the parameter value changes by:

receiving user input that indicates a snap value; and while changing the parameter value in response to receiving said first transaction input, limiting the magnitude of successive changes to the parameter value to said snap value.

9. The computer-readable medium recited in claim 7, wherein the first translation input and the second translation input form one continuous operation.

10. A computer-readable medium carrying instructions for controlling a parameter value and an appearance of virtual graphical object having at least one visual attribute using a computer system and a graphical user interface, the instructions including instructions for performing the steps of:

displaying on the graphical user interface a user interface control that is associated with said parameter value;

displaying a cursor on the graphical user interface;

receiving input from a cursor control device associated with said cursor, wherein said cursor control device is capable of generating activation input and translation input;

in response to receiving activation input but not translation input from said cursor control device while said cursor is within said user interface control, invoking a first parameter control function that changes the parameter value and proportionately increasing the visual attribute of the virtual graphical object;

in response to receiving a first translation input that activates said cursor within said user interface control and moves said cursor in a particular direction outside said user interface control, invoking a second parameter control function; and in response to being invoked, said second parameter control function changing the parameter value based on said particular direction;

wherein the first translation input is an operation that moves said cursor to a first location that is in said first direction relative to said user interface control;

while said cursor is at said first location, and in the same operation, receiving a second translation input that moves said cursor from said first location in a second direction that is opposite to the first direction; and in response to said second translation input, changing the parameter value and the visual attribute of the virtual graphical object in a manner opposite to that caused by the first translation input.

11. The computer-readable medium of claim 10 wherein the step of invoking a first parameter control function that changes the parameter value includes invoking a step function that changes the magnitude of the particular parameter by a predetermined amount.

12. The computer-readable medium of claim 10 further including instructions for performing the steps of:

incrementing the new value in response to translation input that moves the cursor further from said user interface control; and decrementing the new value in response to translation input that moves the cursor towards said user interface control.

* * * * *